Sept. 12, 1972  J. W. ROSS ET AL  3,691,047
MEMBRANE ELECTRODE
Filed Jan. 8, 1970
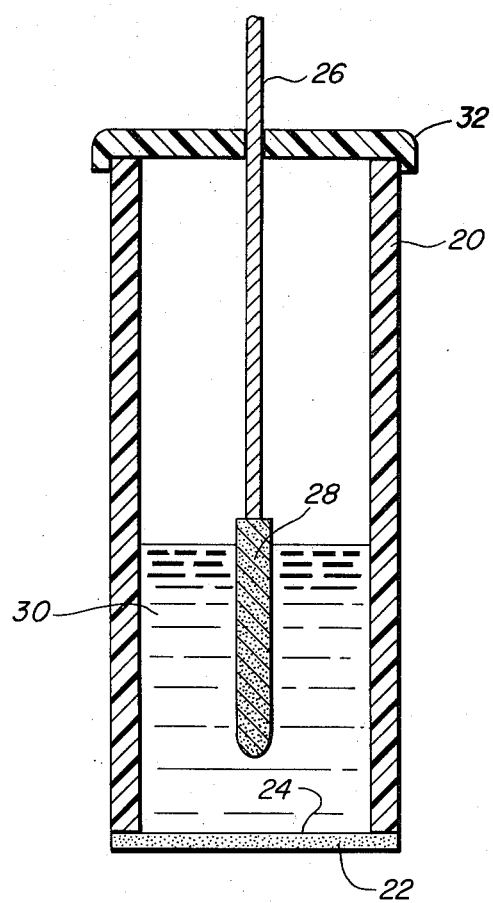
JAMES W. ROSS
MARTIN S. FRANT
INVENTORS.
BY
Schiller & Pandiscio
ATTORNEYS United States Patent Office 3,691,047
Patented Sept. 12, 1972

3,691,047
MEMBRANE ELECTRODE
James W. Ross and Martin S. Frant, Newton, Mass., assignors to New England Merchants National Bank, Boston, Mass.
Filed Jan. 8, 1970, Ser. No. 1,365
Int. Cl. G01n 27/30; B01k 3/10
U.S. Cl. 204—195 M                                        6 Claims

ABSTRACT OF THE DISCLOSURE

An ion-sensitive membrane for potentiometric electrodes, the membrane being a gel in which the solid phase is an inert polymer such as cellulose triacetate and the liquid phase is an ion-exchange liquid such as calcium (bis-dibromoleylphosphate)$_2$ dissolved in dioctylphenylphosphate.

---

This invention relates to potentiometric measurement of the activity of ionic species in solution, and more particularly to potentiometric electrodes using membranes with organic ion-exchange materials as an ion-sensitive element.

The activity or concentration of a number of ionic species in solution can be determined by known systems involving an electrode sensitive to the activity of that species and a reference electrode, both in contact with the solution under test. For a given temperature, the half cell potential of the reference electrode is substantially constant, within limits, regardless of the activity of the ionic species; the half cell potential of the other electrode varies with the ionic activity according to the well-known Nernst equation. The total cell potential is then readily ascertained by a potentiometric measuring device and is a function of the ionic activity.

Ion-sensitive electrodes typically exhibit preferential selectivity to particular ionic species. A group of such selective electrodes, typified by those described in U.S. Patents Nos. 3,429,785; 3,438,886; and 3,445,365, have ion-sensitive membranes formed of a porous inert substrate filled with an ion-exchange organic liquid, for example a salt of a phosphoric acid ester dissolved in-decanol. Such an electrode exhibits selective response to divalent cations such as those of calcium and magnesium.

Characteristically, such electrode membranes include an exchanger insoluble in water but dissolved in an organic solvent. The solvent is a relatively non-volatile liquid immiscible with water and substantially chemically inert with respect to the exchanger, the substrate, and the solution which is to be tested. The substrate is insoluble in both the solvent and in water, and is non-reactive chemically with the exchanger, solvent, water and the ionic species intended to be measured. The porous substrate is usually preformed as a dry "sponge" of solid material and is then filled with the ion exchange liquid, typically by vacuum filling, by pressure or by the capillarity of the interstices of the substrate.

In many instances, in such membranes, the solid substrate material constitutes the greater proportion of the total volume. With such membranes it is desirable to establish a relatively low electrical resistivity. Generally, the higher the proportion of exchanger liquid to solid substrate, the relatively lower the electrical resistivity. Further, if the pores of the substrate are quite large, it will be appreciated that substantial amounts of the exchanger can be lost by leakage from the membrane and particularly by leaching into the surrounding aqueous solutions. Where the amount of exchanger is limited because of the preformed structure of the substrate, the life of the membrane can be quite short.

The membranes used in ion-selective electrodes can be readily distinguished over other ion-exchange membranes such as those exemplified by U.S. Patent No. 2,860,097, and the like. Such ion-exchange membranes are typically classified as either homogenous or heterogeneous. The homogeneous membranes are usually condensed continuous sheets of solid ion-exchange resin material, usually supported by a backing or other mechanical reinforcement. The heterogeneous membranes usually comprise a finely powdered solid ion-exchange resin held together by an inert polymeric binder such as polystyrene, polyethylene, methyl methacrylate, and others. In both types of membrane the resin functions as a concentrated solution of an electrolyte in which the mobility of one type of ion is restricted. However, it should be kept in mind that because the resin is in solid form in the membrane, the ion mobility through the solid phase is so limited that such resin exchange membranes are not considered useful in the ion-specific electrode art. The ion exchange site are permanently fixed in the solid polymer framework. Ion movement takes place only by a jump mechanism from site to site unlike ion transport in a liqiud membrane system.

A principal object of the present invention is therefore to provide a novel ion-sensitive electrode having a membrane in which the major proportion is an organic ion-exchanger dissolved in a non-volatile organic solvent. Other objects of the present invention are to provide a novel ion-sensitive electrode incorporating an organic ion exchange material dissolved in a non-volatile organic solvent and formed such that the liquid cannot be readily expressed from the membrane; to provide such an electrode in which the membrane is essentially a gel of a chemically inert polymer, i.e. one that is not involved directly in any ion-exchange process because it lacks ion-exchange sites; to provide such a membrane which is simple and inexpensive to make; and to provide such a membrane in which the proportions and dimensions can be readily controlled.

To effect the foregoing and other objects, the present invention contemplates a novel ion sensitive electrode having as the ion sensitive element therein a membrane of a gelled mixture wherein the solid phase is a substantially chemically inert polymeric matrix and the liquid phase is an organic ion-exchange material dissolved in a substantially non-volatile organic solvent liquid.

Other objects of the present invention will in part appear obvious and will in part appear hereinafter. The invention accordingly comprises the apparatus possessing the construction, combination of elements and arrangement of parts and the method constituting the several steps and order thereof for forming the apparatus, all of which are exemplified in the following detailed disclosure and the scope of the application of which will be indicated in the claims.

For a fuller understanding of the nature and objects of the invention reference may be had to the following detailed description taken in connection with the accompanying drawing wherein there is shown in a schematic cross sectional view a novel electrode embodying the principals of the present invention.

As shown in the drawing a typical embodiment of the present invention includes a body 20, typically a hollow elongated cylinder formed of an inert polymeric material such as polytetrafluorethylene, or the like. Mounted across and covering one end of body 20 is an ion sensitive element in the form of membrane 22. Preferably the edges of membrane are sealed to body 20 so as to form a complete closure for the end of the latter. Disposed within body 20 are means for providing a substantially fixed contact potential between the inner surface 24 of membrane 22 and an external lead 26 intended to be coupled to one side of a potentiometric measuring device (not shown) in accordance with the usual techniques employed with such electrodes. As such means and in the usual manner disposed within the interior of body 20 and spaced from surface 24 of membrane 22 is a reference electrode 28. Typically the latter is an Ag-AgCl type electrode, although as well known in the art other internal reference electrodes can be employed. Electrode 28 is electrically coupled to the inner surface 24 of membrane 22 by a standard electrolyte solution 30 e.g. $\frac{1}{10}$ N KCl or the like. The internal reference electrode 28 is connected to electrically conductive lead 26. If desired, the other end of body 20 is provided with cap 32 through which lead 26 extends. Membrane 22 is a gel formed of a substantially non-volatile, organic liquid phase dispersed in an organic polymeric solid phase. The exchanger can be any of a number of known ion exchange materials which have been employed in other ion specific electrodes. For example, an electride particularly sensitive to chlorate, bromide, iodide, nitrate, and chlorite ions uses as an ion exchanger a metal-organic ligand complex such as nickel (II) tris bathophenanthroline nitrate. As a typical solvent for the foregoing exchanger one may employ paranitrocymene. An example of a cation exchanger is calcium (bis-dibromoleylphosphate)$_2$ which exhibits excellent sensitivity to calcium ions and magnesium ions. Other salts useful as cation exchangers are calcium (bis-dioctylphosphate)$_2$, calcium (bis-didodecylphosphate)$_2$, and calcium (bis-dioleylphosphate)$_2$. Preferred solvents for the latter cation exchangers which typically are ordinarily solid waxy, high melting point material are dioctylphenylphosphonate, dodecylbenzyl alcohol, and the like.

While a number of polymeric materials are useful, the polymer employed should be soluble in an organic solvent which in turn is substantially miscible with the organic solvent solution which contains the exchanger. Further, the solvent for the solid polymer should preferably be volatile so that it can be evaporated in sufficient quantities to permit gellation to occur. A preferred polymer is cellulose triacetate, which typically can be dissolved in $CCl_4$, methyl trichloride and the like.

Typically, the membrane is formed by dissolving a quantity of the polymeric material in a relatively high volatility organic solvent, and also by dissolving the ion-exchanger in the relatively non-volatile organic solvent. In some instances conveniently, the ion exchanger is quite readily soluble in a quantity of the volatile solvent which then is mixed into the non-volatile solvent, so that after evaporation of the volatile solvent the exchanger remains in solution in the non-volatile solvent. The two solutions of exchanger and polymer are then thoroughly mixed together and simply cast upon a smooth surface to the desired thickness, and allowed to stand until the volatile solvent has substantially entirely evaporated. The result is a gelled sheet or membrane in which the relative proportions of the solid and liquid phase can be very carefully controlled over a wide range of proportions.

Examples of the method for forming the electrodes of the invention are shown as follows:

EXAMPLE I

A calcium sensitive membrane was made by mixing together in the following proportions by weight: 19.1% cellulose triacetate (Eastman 2314), 14.4% calcium exchanger which is calcium (bis-dibromoleylphosphate)$_2$ and 66.5% dioctylphenylphosphonate (DOPP). The cellulose triacetate was first dissolved in carbon tetrachloride to form a first solution. The exchanger was then dissolved in a quantity of methyltrichloride and then mixed with the DOPP to form a second solution. The two solutions were then mixed together and poured out on a casting plate to form a liquid layer of approximately $\frac{1}{16}$ to $\frac{1}{8}$ inch in thickness. The sheet was allowed to sit for several hours until substantially all of the carbon tetrachloride and methyl trichloride had evaporated. This produced a membrane of about 9 mils thick which was then stripped from the casting plate. Its resistance was measured as approximately 2.2 megohms sq. in.

The membrane was formed in an electrode as described and tested against the three following standard solutions:

Solution A: 0.50 millimoles $CaCl_2$, 150 millimoles NaCl
Solution B: 1.00 millimoles $CaCl_2$, 150 millimoles NaCl
Solution C: 2.00 millimoles $CaCl_2$, 150 millimoles NaCl The response to these standardized solutions was as follows:

| Standard: | E(mv.) |
|---|---|
| A | 20.5 |
| B | 28.5 |
| C | 36.6 |

The slope between response to standards here is about 8. Theory predicts that the slope should be 9 but the $Na^+$ background changes it slightly.

EXAMPLE II

A calcium sensitive membrane was made by mixing together the same materials as Example I but in the following proportions by weight: 94.9% cellulose triacetate; 0.93% calcium exchanger; and 4.1% DOPP.

The mixture was made as in Example I and the material cast upon a casting plate to form a membrane with a thickness of approximately 5 mils. The resulting membrane showed a resistivity of approximately 90 megohms/sq. in. indicative of the relatively smaller proportion of exchanger to the polymer.

When checked against the standard solutions the following was found:

| Standard: | E(mv.) |
|---|---|
| A | 38.8 |
| B | 43.4 |
| C | 49.4 |

EXAMPLE III

A calcium sensitive membrane was made by mixing together the same materials as in the preceding examples but in the following proportions by weight: 64.4% cellulose triacetate; 6.41% exchanger; and 29.19% DOPP. The membrane cast therefrom had a thickness of about 8 mils and showed a resistivity of 50 megohms/sq. in. The membrane when tested against the standards showed the following results:

| Standard: | E (mv.) |
|---|---|
| A | 17.7 |
| B | 23.9 |
| C | 29.2 |

EXAMPLE IV

Yet another exchanger was formed using the same materials as in the preceding examples but in the following proportions by weight: 30% cellulose triacetate, 12.6% exchanger and 57.4% DOPP. The resulting membrane had a thickness of 5 mils. and showed slopes (for a two-fold change in calcium concentration) ranging from approximately 7.9 to 9.5 when tested against various $Ca^{++}$ standards.

EXAMPLE V

In order to determine the need for the continued presence of the solvent such as DOPP in the resulting membrane, a membrane was formed by mixing together 28% cellulose triacetate and 72% of the same calcium exchanger used in the previous examples, both in methyl trichloride. The resulting solution was then poured out on a casting plate to form a membrane upon evaporation of the solvent.

When tested against the standards A, B, and C heretofore described, the voltage read in each instance was around +30.4 milivolts and there was no slope at all between the responses to the different concentrations of calcium salts. When tested against pure solutions respectively of 0.1 M $CaCl_2$ and 0.01 M $CaCl_2$, the resulting slope was 10 whereas it should have been approximately 29.5.

This example is believed to demonstrate that without the liquid solvent, the resulting membrane, which is a solid-in-solid structure, does not function satisfactorily as an ion sensitive membrane for potentiometric electrode.

EXAMPLE VI

A nitrate sensitive membranse was formed by mixing together cellulose triacetate in $CHCl_3$, the polymer being 4.6% by weight, to form a first solution. A second solution was formed by mixing Ni (II) tris bathophenanthroline nitrate in 2-nitroparacymene to form a second solution. The first and second solutions were mixed so that one part of the first solution by weight was the equivalent of one part of the Ni salt exchanger used in the second solution.

The resulting mix was poured onto a casting plate and allowed to set by attendant evaporation of volatile methyl trichloride.

The membrane, having a thickness of about 8 mils and a resistivity of about 3 megohms, was tested against a number of solutions of $NaNO_3$ with results as follows:

| Concentration: | E (mv.) |
|---|---|
| $10^{-1}$ | −36.5 |
| $10^{-2}$ | +21 |
| $10^{-3}$ | +75 |

The slopes obtained here show excellent agreement with the expected theoretical results.

EXAMPLE VII

Another nitrate sensitive membrane was formed using the same materials as in previous example but in proportions so that 9 parts of the 4.76% cellulose triacetate in $CHCl_3$ was used for each part of exchanger by weight to produce a 4 mil thick membrane showing a resistivity of about 1 megohm. When checked against tests solutions of $NaNO_3$, the following results were obtained:

| Concentration: | E (mv.) |
|---|---|
| $10^{-1}$ | −43.2 |
| $10^{-2}$ | +16 |
| $10^{-3}$ | +80 |

It will be appreciated that in each instance the membrane formed is essentially a gel having a solid phase of the polymer and a liquid phase of the exchanger dissolved in a relatively low vapor pressure solvent. Not only can the proportions of exchanger and polymer be extremely wide (therefore permitting the use of large amounts of exchanger with the attendant advantages of low resistivity and long life) but the membranes can very easily be prepared in a wide range of desired thicknesses and equally important with a wide range of desired surface area.

Since certain changes may be made in the above product and process without departing from the scope of the invention herein involved, it is intended that all matter contained in the above description or shown in the accompanying drawing shall be interpreted in an illustrative and not in a limiting sense.

We claim:

1. A potentiometric ion-sensitive electrode comprising in combination:
   a membrane of a gelled mixture wherein the solid phase is a substantially chemically inert polymeric matrix comprising cellulose triacetate and the liquid phase is an organic, ion-exchange material dissolved in a substantially non-volatile solvent, and
   means for forming a substantially fixed contact potential with one surface of said membrane.

2. An electrode as defined in claim 1 wherein said liquid phase comprises a salt of a phosphate enter dissolved in said solvent, the ratio of solid to liquid phase being between about 19:81 to about 95:5.

3. An electrode as defined in claim 2 wherein said solvent is dioctylphenylphosphonate.

4. An electrode as defined in claim 1 wherein said liquid phase comprises a cation-exchange material dissolved in said solvent.

5. An electrode as defined in claim 1 wherein said liquid phase comprises an anion-exchange material dissolved in said solvent.

6. An electrode as defined in claim 1 wherein said liquid phase comprises a salt of a phosphate ester dissolved in said solvent.

References Cited

UNITED STATES PATENTS

| 2,732,351 | 1/1956 | Clarke | 204—296 X |
| 2,957,206 | 10/1960 | Mindick et al. | 204—296 X |
| 3,297,595 | 1/1967 | Mindick et al. | 204—296 X |
| 3,429,785 | 2/1969 | Ross | 204—1 T |
| 2,614,976 | 10/1952 | Patnode et al. | 204—195 |
| 3,483,112 | 12/1969 | Ross | 204—195 |
| 3,542,662 | 11/1970 | Hicks et al. | 204—195 |
| 3,562,129 | 2/1971 | Simon | 204—195 |

OTHER REFERENCES

"Ion-Selective Electrodes," Nat. Bureau of Standards Special Pub. 314, pp. 66 & 86–88 (1969).

GERALD L. KAPLAN, Primary Examiner

U.S. Cl. X.R.

204—296

UNITED STATES PATENT OFFICE
CERTIFICATE OF CORRECTION

Patent No. 3,691,047   Dated September 12, 1972

Inventor(s) James W. Ross and Martin S. Frant

It is certified that error appears in the above-identified patent and that said Letters Patent are hereby corrected as shown below:

Column 1, lines 4 - 5   "New England Merchants National Bank, Boston" should be -- Orion Research Incorporated, Cambridge -- .

Signed and sealed this 10th day of April 1973.

(SEAL)
Attest:

EDWARD M. FLETCHER, JR.
Attesting Officer

ROBERT GOTTSCHALK
Commissioner of Patents